United States Patent Office 3,417,567
Patented Dec. 24, 1968

3,417,567
SOIL STABILIZATION
Einosuke Higashimura, Tokyo, and Masao Ishii and Yoshio Ishikawa, Ohtake-shi, Japan, assignors to Mitsubishi Rayon Co., Ltd., Tokyo, Japan, a corporation of Japan
No Drawing. Filed Mar. 16, 1967, Ser. No. 623,557
Claims priority, application Japan, Mar. 18, 1966, 41/16,806, 41/16,807
11 Claims. (Cl. 61—36)

ABSTRACT OF THE DISCLOSURE

The present invention relates to a process for treating soil which comprises applying to soil an aqueous solution of a mixture consisting of one or more water-soluble monomers (a) represented by the formula

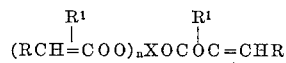

wherein R and $R^1$ each represent a hydrogen or methyl group, $n$ is 1 or 2, and X represent a group containing 2 to 18 carbon numbers and having at least one hydroxyl group and moreover having in the main chain less than 4 of oxygen atom or nitrogen atom or both the two in total, and one or more other polymerizable monomers (b) to soil in the presence of redox catalyst to carry out copolymerization reaction and converting said soil and said polymerizable mixture into a concentrated mass of soil capable of being substantially insoluble in water and of strong structure in said desired form.

---

The present invention relates to a method for aggregating and stabilizing soil by polymerizing a polymerizable substance in the said soil.

In the fields of civil engineering and construction works, it has hitherto been practiced, as a means of congealing and solidifying soil, the method of applying inorganic substance thereinto, for example, such as cement, water glass and the like, applying these inorganic substances into soil having large interstices involved therein results in a helpful result. Because of high viscosity thereof, however, they are poor in permeability for such soil as having minute interstices involved therein, whereby the object thereof cannot be satisfactorily accomplished. For solidifying soil having minute interstices involved therein, therefore, there has been employed the method which comprises applying chemical solution thereinto.

In the chemical solution pouring method, a method of treating soil is a method which comprises first preparing an aqueous solution containing polymerizable substance, applying said aqueous solution into soil to polymerize and further converting said polymerizable substance into a water-insoluble state having three dimensional structure to form a strong polymerized product-soil concentrated mass.

The requirements desired in the field of civil engineering and construction works are first to strengthen the foundation and to make the subsequent works easy and, also to carry out the grouting for preventing gushing water during tunnel or underground works and to prevent soil collapse and so forth. In order to satisfy the requirements mentioned above, it is necessary to employ chemical agent which is capable of sufficiently permeating into throughout minute interstices involved in soil and rapidly forming a water-insoluble composition structure having high strength.

The present invention is characterized in that a mixed aqueous solution of compound represented by the following general formula

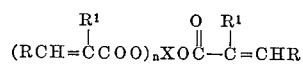

wherein R and $R^1$ each represent hydrogen or methyl group, X represents a group containing 2 to 18 carbon atoms having at least one hydroxyl group and moreover having in the main chain less than 4 atoms selected from the group consisting of oxygen and nitrogen and $n$ represents an integer of 1 to 2, and at least one kind of water-soluble ethenoid monomer is polymerized in soil with use of redox catalyst, thereby to convert said soil into a strong, water penetration resistant concentrated mass having three dimensional structure.

When an aqueous solution of water-soluble ethenoid monomer not having divinyl structure, for example, acrylamide or its derivatives is applied into soil to polymerize said ethenoid monomer, a water-soluble three dimentional structure cannot be formed by said ethenoid monomer only. It is, therefore, necessary to add thereto the second substance capable of forming three dimensional structure, whereby to use the water-soluble ethenoid monomer in the form of mixture with said second substance.

According to the present invention, it is possible to remarkably improve anti-water-permeation property of soil and strength of the foundation by solidifying said soil with use of a mixed aqueous solution consisting of as the first component one kind of compound represented by the aforementioned general formula

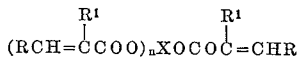

wherein R, $R^1$, X and $n$ have the same meanings as identified above, and at least one kind of water-soluble ethenoid monomer as the second component.

Because said components in accordance with the present invention have a hydroxyl group or imine group in the molecules, a gel formed by the polymerization of said component with a water-soluble ethenoid monomer is high in adhesiveness with grains of soil, whereby to be able to remarkably improve the grouting effect which is required in civil engineering and construction works.

As one of chemical agents used for such purpose as mentioned above, an aqueous solution of polyvalent salt of acrylic acid has been put into practical use.

However, when polyacrylate such as calcium acrylate in the form of an aqueous solution thereof is polymerized in soil, a gel having a water-insoluble three dimensional structure is formed, which has an action to set and solidify said soil but has a defect that is poor in anti-water-permeation property which attaches great importance to civil engineering and construction works.

Particularly, decrease of the above-mentioned anti-water permeation property tends to be further accelerated with the lapse of time.

The above-mentioned is considered to be attributable to that a modification take place in the polymerized product of polyvalent salt of acrylic acid.

Marked syneresis of the polymerization product of an aqueous solution of polyvalent salt of acrylic acid can be readily observed in a homopolymer which does not contain soil.

An object of the present invention resides in that a mixed aqueous solution of at least one kind of compounds represented by the general formula $$(RCH=\overset{R^1}{\underset{|}{C}}COO)_n XOCO\overset{R^1}{\underset{|}{C}}=CHR$$

wherein R and $R^1$ represent respectively a hydrogen or methyl group, X also represents a group containing 2 to 18 carbon atoms having at least one hydroxyl group and moreover having in the main chain less than 4 atoms selected from the group consisting of oxygen and nitrogen, and $n$ is an integer of 1 to 2, and ammonium salt or metal salt of acrylic acid or a mixed aqueous solution containing as the third component in addition to the aforesaid two components a water-soluble ethenoid monomer capable of being polymerized therewith is applied into soil, thereby to strengthen said soil. After the soil is treated with the salts of acrylic acid and the above-mentioned comonomers, the product becomes relatively impermeable, and able to withstand the effects of water.

The gel structure in accordance with the present invention obtained by polymerizing a mixed aqueous solution of a compound represented by the general formula $$(RCH=\overset{R^1}{\underset{|}{C}}COO)_n XOCO\overset{R^1}{\underset{|}{C}}=CHR$$

wherein R, $R^1$, X and $n$ have the same meanings as identified above, and such acrylate as calcium acrylate with use of redox catalyst, is different from a homopolymer structure of acrylate, which does not show syneresis at all.

When soil is congealed and solidified with use of the above mixed aqueous solution, the stabilized soil thereby formed is improved in its strength and anti-water permeation property, compared with the case where acrylate is merely employed. Further, a noteworthy fact is that when soil is congealed and solidified by using a mixed aqueous solution prepared by further adding as the third component a water-soluble ethenoid monomer to a component consisting of at least one kind of said compounds according to the present invention and an acrylate, which is capable of being polymerized therewith, strength and anti-water permeation property of a mass of soil thus congealed and solidified are further markedly improved.

Furthermore, a mixed aqueous solution consisting of not less than three components including said compound in accordance with the present invention has a remarkable characteristic that when said mixed aqueous solution is employed and even if an amount of polymerizable components relative to the amount of the soil, strength and anti-water-permeation thereof can still be maintained, which are required conditions in the field of civil engineering and construction works. As a result, the above mixed aqueous solution is useful from the economical point of view because the cost of soil stabilizing agent thereby provided can be reduced.

In the compounds according to the present invention represented by the general formula $$(RCH=\overset{R_1}{\underset{|}{C}}COO)_n XOCO\overset{R_1}{\underset{|}{C}}=CHR$$

wherein R, $R^1$, X and $n$ have the same meaning as identified above, as for a component of $$RCH=\overset{R_1}{\underset{|}{C}}OOC-$$

there may be mentioned such as $$CH_2=CHCOO-, \quad CH_3CH=CHCOO-$$

$CH_2=C(CH_3)COO-$ and the like, particularly preferred are $CH_2=CHCOO-$ and $CH_2=C(CH_3)COO-$.

As for X component, there may be illustrated such as $$-CH_2CH(OH)CH_2-$$
$$-CH_2CH(CH_3)OCH_2CH-(OH)CH_2-$$
$$(CH_2CH_2)_mOCH_2-(OH)CH_2-$$
$$-CH_2CH_2O(CH_2CH_2)_m-OCH_2CH(OH)CH_2-$$

wherein $m$ is integer of 1 to 3, $$-CH_2CH(OH)CH_2OCH_2(C_2H_5)$$
$$(CH_2OH)CH_2-OCH_2CH(OH)CH_2-$$
$$-CH_2C(C_2H_5)-(CH_2OH)CH_2-$$
$$-CH_2C(CH_2OH)_2CH-_2$$
$$-CH_2\overset{CH_2}{\underset{|}{C}}(CH_2OH)CH_2-$$
$$-CH_2CH(OH)CH_2NHCH_2$$
$$CH_2NHCH_2CH(OH)CH_2-$$

and $$(-CH_2CH(OH)CH_2OCH_2CH_2)_3N$$

but particularly $-CH_2CH(OH)CH_2-$, and $$-CH_2C(CH_2CH_3)(CH_2OH)CH_2-$$

are preferable.

As for the method of producing these compounds used in the present invention, there may be mentioned one method for obtaining such compounds which comprises reacting an aliphatic unsaturated acid or its derivatives with polyhydric alcohol in the presence of a catalyst, for example, novel acid such as sulfuric acid, p-toluenesulfonic acid, boron difluoride or its complex compound or, for example, base such as sodium methylate, sodium carbonate, triethylamine and sodium hydroxide. The aliphatic unsaturated acid and its derivatives used in the above method include acrylic acid, methacrylic acid, crotonic acid, methyl acrylate, ethyl acrylate, methyl methacrylate, ethyl methacrylate and the like. Particularly, methyl acrylate and methyl methacrylate are preferable. As for polyhydric alcohol, there may be illustrated glycerine, trimethylol propane, pentaerythritol hexanetriol, diethanol amine, triethanol amine and the like. Particularly, glycerine, trimethylol propane, and triethanol amine are preferred.

The other method for producing the aforesaid compounds used in the present invention is a method which comprises reacting glycidyl ester represented by the formula $$R_2CH=\overset{R_3}{\underset{|}{C}}-COOCH_2-CH\overset{\diagdown}{\underset{O}{\diagup}}CH_2$$

wherein $R_2$ and $R_3$ each represent hydrogen or methyl group, with a compound represented by the formula $$R_4CH=\overset{R_5}{\underset{|}{C}}-COOY$$

where $R_4$ and $R_5$ each represent hydrogen or methyl group, and Y represents hydrogen or lower alkyl group containing hydrogen or active hydrogen, or a lower alkyl compound having two or more active hydrogens, in the presence of a catalyst, for example, such as acid (e.g. mineral acid, organic acid and Lewis acid, etc.) or base (e.g. sodium methylate, sodium hydroxide, triethyl amine, etc.).

As for glycidyl ester, respective glycidyl esters of acrylic acid, methacrylic acid and crotonic acid are preferably employed.

The compounds represented by the formula

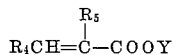

include acrylic acid, methacrylic acid, crotonic acid, hydroxyethyl acrylate, hydroxypropyl acrylate, hydroxyethyl methacrylate, aminoethyl acrylate, amine ethyl methacrylate and the like. Particularly, acrylic acid, methacrylic acid and amino ethyl methacrylate are preferably used.

The lower alkyl compounds having two or more active hydrogen used in the above method include ethylene glycol, glycerine trimethylolpropane, ethylenediamine diethanolamine, triethanolamine and the like.

Ethenoid in the form of monomer must be water-soluble in the concentration to be employed, and such water-soluble ethenoid monomer containing acryl or methacryl group are particularly preferred.

As exemplary of these water-soluble ethenoid monomers, there may be mentioned acrylic acid and its salts, methacrylic acid and its salts, for example, ammonium acrylate, calcium acrylate, calcium methacrylate, magnesium acrylate, zinc acrylate, zinc methacrylate, acrylamide, methacrylamide. N - methylol acrylamide, N-methylol methacrylamide, or acrylic acid such as hydroxyethyl acrylate, hydroxypropyl acrylate, dimethylamino ethylmethacrylate and alkyl ester of methacrylic acid and the like. The other suitable ethenoid monomers include acrylonitrile, methacrylonitrile, sodium maleate, methyl vinyl ketone, allyl amine and the like.

Mixing ratio of the aforesaid compound represented by the general formula

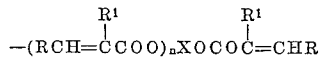

wherein R, R¹, X and n have the same meanings as identified above, to the water-soluble ethenoid monomer which may be widely varied according to the object of engineering and construction works, but it is usually 1.200 to 1:1, preferably 1:150–1:10.

Weight ratio of salt of acrylic acid to water-soluble ethenoid monomer excluding said salt is 1:200 to 1:1, preferably 1:50 to 1:5.

When two or more water-soluble ethenoid monomers are employed in the form of aqueous solution of polymerizable components, gel forms having markedly different properties can be obtained by changing the mixing ratio of these monomers.

Furthermore, it is possible to obtain a gel having high strength by increasing the ratio of the aforesaid compounds in accordance with the present invention represented by the general formula

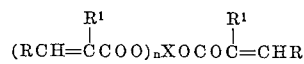

wherein R, R′, X and n have the same meanings as identified above, to the water-soluble ethenoid monomer. It is, therefore, preferable to use said compounds in an amount of increased proportion to ethenoid monomer in the field of engineering and construction works where very high strength as well as stabilization of soil is required.

As for the catalyst employed in the present invention, redox catalyst is mostly preferred. Preferred oxidizing agents include ammonium persulfate or potassium.

On the one hand, as for the reducing agents, there may be employed this sodium sulfate, polymerized sodium sulfate, ferrous sulfate, dimethyl amino propionitrile, nitrilotrispropionamide.

Weight ratio of oxidizing agent to reducing agent is preferably employed in amounts corresponding to stoichiometric amount. However, according to nature, of soil, for example, a pH of said soil, it may suitably be varied. Amount of the catalyst to be used is not limited at all, it may be varied according to nature of said to be treated and the objective of works, but it can be employed in an amount of 0.1–10% by weight based on the weight of the polymerizable components.

Weight ratio of polymerizable component to soil is preferably one part (weight) per 1–200 parts of soil, but this proportion can be changed according to the object of engineering and construction works aimed at.

As for the general means of congealing and solidifying soil, it is preferable to carry out congelation and solidification of soil by preparing polymerizable components in the form of aqueous solution and the resultant aqueous solution along an aqueous solution of catalyst while applying pressure to penetrate into said soil.

The present invention will be illustrated by referring to the following reference examples, and examples of typical embodiments of the invention, in which the part or parts are by weight.

REFERENCE EXAMPLE 1

An aqueous solution consisting of 9 parts of calcium acrylate, 0.1 part of dimethyl amino propionitrile and 50 parts of water was mixed with an aqueous solution consisting of 0.1 part of ammonium persulfate and 20 parts of water at 20° C. After about 5 minutes since the initiation of mixing, polymerization took place to form a gel. The thus formed gel contracted by about 10% of the original volume thereof after allowing to stand for one week.

REFERENCE EXAMPLE 2

Calcium acrylate together with redox catalyst was mixed with the standard sand of Toyoura origin. The mixture was placed in a mold having 50 mm. in diameter and 100 mm. in length and allowed to stand. After about 15 minutes since the molding was initiated, the congelation began to take place. After 3 hours elapsed, the thus solidified mixture was released from the mold to measure the strength thereof. Furthermore, the water permeation coefficient was measured after 2 hours elapsed. The results of the above measurements are shown in Table I.

Example 1

An aqueous solution consisting of 1.5 parts of glycerol diacrylate, which is a reaction product of glycerine with methylacrylate, 16.5 parts of calcium acrylate, 0.2 part of dimethyl amino propionitrile and 81.8 parts of water was mixed with an aqueous solution consisting of 0.2 part of ammonium persulfate and 9.8 parts of water at 20° C. As a result, polymerization was initiated after about 5 minutes elapsed to form a gel.

The thus obtained gel did not contract even after one month elapsed.

Example 2

The same aqueous solution as in Example 1 was mixed with the standard sand of Toyoura origin and allowed to stand. As a result, congelation began to take place after about 15 minutes elapsed.

After 3 hours and 2 hours elapsed, measurements of strength and water permeation coefficient were carried out respectively to obtain the results as shown in Table I.

Example 3

A mixture consisting of glycerol diacrylate and calcium acrylate, which are reaction products of acrylic acid with glycidyl acrylate was mixed, together with redox catalyst, with the standard sand of Toyoura origin and the resultant mixture was allowed to stand. As a result, polymerization began to take place after about 15 minutes elapsed. Measurements of strength and water permeation coefficient were carried out after 3 and 2 hours elapsed, respectively, whereby to obtain the results as shown in Table I.

TABLE I

| Polymerizable component | Mixing ratio of polymerizable component, percent | Total unit of polymerizable components in an aqueous solution, percent | Compression strength, kg./cm.² | Water permeation coefficient, cm./sec. |
|---|---|---|---|---|
| Calcium acrylate | 100 | 18 | 1.4 | $1.2 \times 10^{-5}$ |
| Do | 100 | 9 | 0.3 | $4.0 \times 10^{-4}$ |
| Do | 92 | } 18 | 2.4 | $3.1 \times 10^{-6}$ |
| Reaction product of glycerine-methyl acrylate | 8 | | | |
| Calcium acrylate | 90 | } 18 | 7.1 | $9.1 \times 10^{-8}$ |
| Reaction product of glycerine-methyl acrylate | 3 | | | |
| Hydroxyethyl acrylate | 7 | | | |
| Calcium acrylate | 92 | } 9 | 0.4 | $8.3 \times 10^{-6}$ |
| Reaction product of glycerine-methyl acrylate | 3 | | | |
| Hydroxy-ethyl methacrylate | 7 | | | |
| Calcium acrylate | 92 | } 15 | 6.6 | $2.1 \times 10^{-6}$ |
| Reaction product of glycerine-methyl methacrylate | 5 | | | |
| Hydroxyethyl methacrylate | 3 | | | |

NOTE.—Percent represents percent by weight. As the conditions common to all the above cases, there were employed 0.2% each of ammonium persulfate and dimethyl amino propionitrile based on the weight of the aqueous solution, and 400 parts of the standard sand of Toyoura origin based on 100 parts (weight) of the aqueous solution.

Example 4

An aqueous solution consisting of 1.0 part of

which was a reaction product of hydoxy ethylmethacrylate with glycidyl acrylate, 11.1 g. of calcium acrylate, 1.3 g. of hydroxy ethylmethacrylate, 0.3 part of ammonium persulfate, 0.3 part of sodium thiosulfate and 100 parts of water was prepared. Said aqueous solution was mixed with 400 parts of the standard sand of Toyoura origin, and as a result, polymerization began to take place at 20° C. after 20 minutes elapsed, and a strong water-insoluble concentrated mass of sand was formed after 3 hours elapsed.

Example 5

1 part of glycerol diacrylate, 1.7 parts of calcium acrylate, 2 parts of acrylamide, 0.3 part of ammonium persulfate, 0.3 part of sodium thiosulfate, 80 parts of water and 400 parts of the standard sand of Toyoura origin were mixed together. As a result, a water-insoluble mass of sand having fairly good strength was formed after 3 hours elapsed.

Example 6

1 part of $CH_2=CHCOOCH_2CH(OH)CH_2$
$\quad NHCH_2CHO-COCH=CH_2$ which was a reaction product of amino ethylacrylate with glycidyl acrylate, 17 parts of calcium acrylate, 2 parts of hydroxy ethylacrylate, 0.3 part of potassium persulfate, 0.3 part of sodium bisulfite, 80 parts of water and 400 parts of the standard sand of Toyoura origin were mixed together to obtain a mass of sand. The thus mass of sand was water-insoluble.

Example 7

2 parts of

15 parts of magnesium acrylate, 2 parts of hydroxy ethylmethacrylate, 0.3 part of ammonium persulfate, 0.3 part of sodium thiosulfate, 80 parts of water and 400 parts of the standard sand of Toyoura origin were mixed together. As a result, congelation began to take place at 20° C., after about 20 minutes elapsed. After 4 hours elapsed, a water-insoluble concentrated mass of sand having strength of 7 kg./cm.³ was obtained.

Example 8

A concentrated mass of sand consisting of 1.5 parts of $[CH_2=CHCOOCH_2CH(OH)CH_2NHCH_2]_2$, which was a reaction product of ethylenediamine with glycidylacrylate, 18 parts of calcium acrylate, 1.5 parts of dimethylamino ethylmethacrylate, 0.3 part of ammonium persulfate, 0.3 part of dimethylamino propionitrile and 400 parts of the standard sand of Toyoura origin was prepared, which was water-insoluble and fairly good in strength.

Example 9

A mixture consisting of 3 parts of $[CH_2=CHCOOCH_2CH(OH)CH_2OCH_2CH_2]_3N$ which was a reaction product of triethanolamine with glycidyl acrylate, 10 parts of calcium acrylate, 0.3 part of ammonium persulfate, 0.3 part of dimethylamino propionitrile, 80 parts of water and 400 parts of the standard sand of Toyoura origin was prepared. After about 15 minutes elapsed, the mixture began to congeal. After 3 hours elapsed, a concentrated mass of sand was obtained, which was insoluble in water.

Example 10

An aqueous solution consisting of 0.7 g. of glycerol diacrylate, which was a reaction product of glycerine with methacrylate, 6.9 g. of acrylamide, 0.2 g. of dimethylamino propionitrile and 80 g. of water, an aqueous solution consisting of 0.2 g. of ammonium persulfate and 20 g. of water, and 400 g. of the standard sand of Toyoura origin were mixed together. The resultant mixture was cast in a cylindrical mold of 500 mm. in diameter and 100 mm. in length to allow to stand. As a result, congelation began to take place after about 15 minutes elapsed. The content of the mold was released after 3 hours elapsed to measure compression strength. The compression strength was 5 g./cm.³ and the mass thus obtained was insoluble in water.

Example 11

A stabilized sand gel obtained by mixing a mixed aqueous solution consisting of 0.9 g. of $CH_2=CHCOOCH_2CH(OH)CH_2$
$\quad (OCH_2CH_2)_4OCOCH=CH_2$ which was a reaction product of tetraethylene glycol monoacrylate glycidylacrylate, 7 g. of acrylamide, 0.3 g. of sodium thiosulfate, 0.3 g. of ammonium persulfate and 100 g. of water, 400 g. of the standard sand of Toyoura origin, was found to be insoluble in water and fairly good in strength when observed after 3 hours elapsed.

Example 12

An aqueous solution consisting of 0.8 g. of $(CH_2=CHCOOCH_2CH(OH)CH_2NHCH_2)_2$ which was a reaction product of ethylene diamine with glycidylacrylate, 7 g. of acrylamide, 0.2 g. of dimethylamino propionitrile, 0.2 g. of ammonium persulfate and 100 g. of water was prepared. To the mixed solution, 400 g. of the standard sand of Toyoura origin was added to mix together. As a result, polymerization began to take place at 20° C. after about 20 minutes elapsed, and a stabilized sand gel was formed, which was high in strength and insoluble in water.

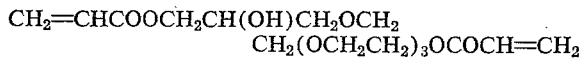

Example 13

A mixture consisting of 1 g. of (CH$_2$=CHCOOCH$_2$CH(OH)CH$_2$OCH$_2$CH$_2$)$_3$N 9 g. of acrylamide, 0.3 g. of sodium bisulfite, 0.3 g. of potassium persulfate, 100 g. of water and 400 g. of the standard sand of Toyoura origin, began to congeal at 20° C. after about 20 minutes elapsed. The formed stabilized sand gel was found to be insoluble in water and fairly good in strength.

Example 14

An aqueous solution consisting of 1 g. of (CH$_2$=CHOOCOCH$_2$OH(OH)CH$_2$OCH$_2$)$_3$CCH$_2$CH$_3$ 20 g. of hydroxy ethylmethacrylate, 0.4 g. of dimethylamino propionitrile, 0.4 g. of ammonium persulfate and 80 g. of water was polymerized to form a gel having strong water permeation resistance.

What is claimed is:

1. A process for treating soil which comprises copolymerizing an aqueous solution of a mixture consisting of at least water-soluble monomer as represented by the formula:

$$(RCH=\overset{R^1}{\underset{|}{C}}COO)_nXOCO\overset{R^1}{\underset{|}{C}}=CHR$$

in which R and R$^1$ each represent a member of the group consisting of hydrogen and methyl group, $n$ is an integer of form—to and X is a group containing 2 to 18 carbon atoms and at least one hydroxyl group and having in the main chain less than 4 selected from the group consisting of oxygen and nitrogen and at least other copolymerizable monomer (B) and converting said soil and said copolymerizable mixture into a concentrated mass of soil capable of being substantially insoluble in water and of strong structure in said desired form.

2. A process according to claim 1, wherein at least one of the copolymerizable monomers (B) is a water-soluble salt selected from the group consisting of metal and ammonium salt of acrylic acid, and metal and ammonium salt of methacrylic acid.

3. A process according to claim 1, wherein at least one of the copolymerizable monomers (B) is an amide selected from the group consisting of methacrylamide.

4. A process according to claim 2, wherein the amount of the water-soluble metal salt employed is 10 to 100 parts by weight per 1 part by weight of the monomers (A).

5. A process according to claim 3, wherein the amount of the amide employed is 10 to 50 parts by weight per 1 part by weight of the monomers (a).

6. A process according to claim 1, wherein the monomer (A) is glycerol diacrylate.

7. A process according to claim 1, wherein the monomer (A) is glycerol dimethacrylate.

8. A process according to claim 2, wherein the monomer (A) is glycerol diacrylate.

9. A process according to claim 2, wherein the monomer (A) is glycerol dimethacrylate.

10. A process according to claim 3, wherein the monomer (A) is glycerol diacrylate.

11. A process according to claim 3, wherein (A) is glycerol dimethacrylate.

References Cited

UNITED STATES PATENTS

| 2,979,863 | 4/1961 | Bauwin et al. | 47—58 |
| 3,148,997 | 9/1964 | Hemwall | 61—36 X |

FOREIGN PATENTS

| 104,414 | 4/1963 | Netherlands. |

JACOB SHAPIRO, *Primary Examiner.*

U.S. Cl. X.R.

260—41; 94—25; 47—58